United States Patent [19]

Garchinsky

[11] 4,323,028

[45] Apr. 6, 1982

[54] VISUAL INDICATING SYSTEM FOR TALL POLE CARRIER RAISING AND LOWING APPARATUS

[75] Inventor: John S. Garchinsky, Aldan, Pa.

[73] Assignee: Union Metal Manufacturing Company, Canton, Ohio

[21] Appl. No.: 116,037

[22] Filed: Jan. 28, 1980

[51] Int. Cl.[3] ............................................ G01D 11/00

[52] U.S. Cl. ............................ 116/285; 116/DIG. 21

[58] Field of Search ................. 116/285, 284, 200, 64, 116/307, DIG. 33, DIG. 21, 209; 362/403

[56] References Cited

U.S. PATENT DOCUMENTS

| | | | |
|---|---|---|---|
| 1,371,395 | 3/1921 | Rast | 116/285 |
| 1,746,133 | 2/1930 | Taylor | 116/285 |
| 3,911,267 | 10/1975 | Kiehn | 116/319 |
| 4,001,573 | 1/1977 | Derasp . | |
| 4,149,230 | 4/1979 | Garchinsky | 362/403 |
| 4,228,488 | 10/1980 | Garchinsky | 362/250 |

*Primary Examiner*—Kyle L. Howell
*Assistant Examiner*—Denis E. Corr
*Attorney, Agent, or Firm*—Frease & Bishop

[57] ABSTRACT

The visual indicating system comprises, in one embodiment, a number of pivoting sub-assemblies borne by the carrier so constructed that they are impelled axially upon making contact with the top of the pole, they pivot. Attached to a horizontal portion of each pivoting sub-assembly below the carrier is a shield that normally covers a brightly colored area on the undersurface of the carrier. However, when the subassembly pivots, the horizontal portion moves aside so that the area is visible from the ground. In another embodiment, the pivoting assembly includes a brightly colored flag between the carrier and the masthead which is normally unseen from the ground until the carrier approaches a predetermined position toward the top of the pole whereupon the flag is caused to pivot outwardly of the carrier into view from below.

5 Claims, 7 Drawing Figures

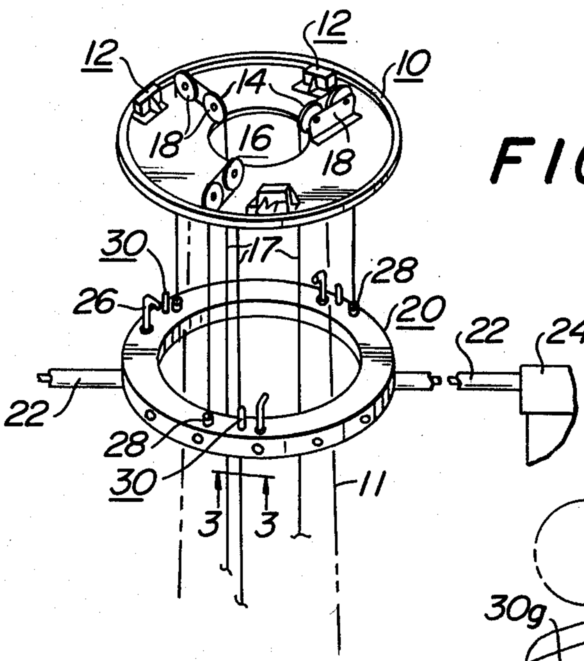
FIG. 1
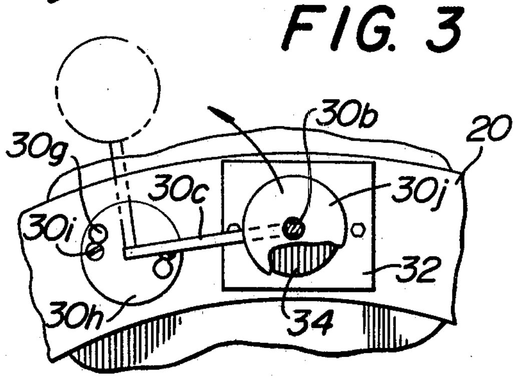
FIG. 3
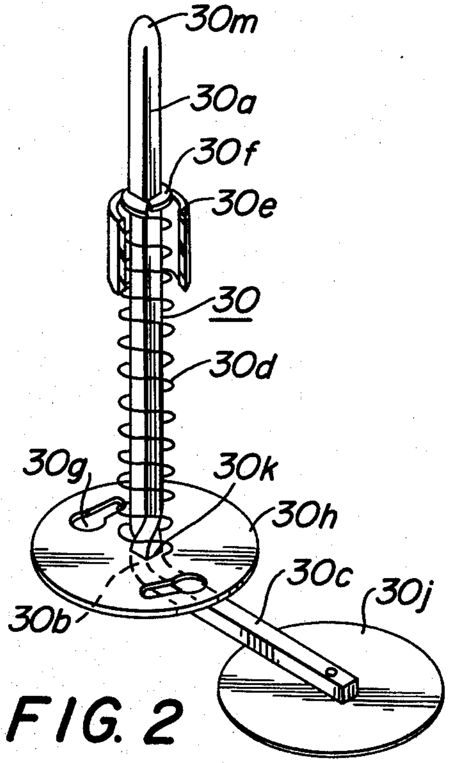
FIG. 2
FIG. 4
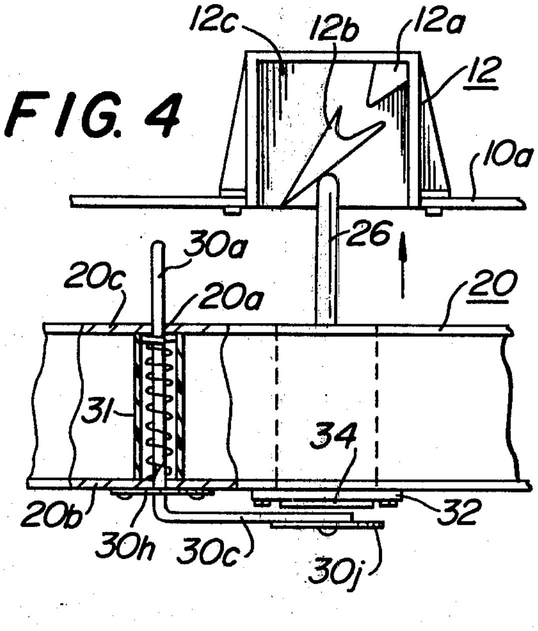

VISUAL INDICATING SYSTEM FOR TALL POLE CARRIER RAISING AND LOWING APPARATUS

BACKGROUND OF THE INVENTION

A. Field of the Invention

This invention relates to tall pole assemblies having a carrier for luminaires or the like which can be raised or lowered and, in particular, to a system for visually indicating when the carrier makes contact with the top portion "masthead" of said pole.

B. Prior Art

Systems are known in which carriers of luminaires or the like are transported upwardly or downwardly about a tall pole. Conventionally, the carriers are lowered and raised by a plurality of cables attached to the carrier which pass over pulleys in the top portion (masthead) of the pole and thence pass downward through the pole for connection to a single winch cable as shown in my U.S. Pat. No. 4,149,230, granted Apr. 10, 1979. Latching mechanisms on the carrier and masthead which are mutually engageable operate to suspend the carrier from the masthead when the carrier is raised to its proper position at the top of the pole.

When maintenance is required for the luminaires, the winch unreels its cable thereby unlatching the carrier and permitting the cables suspending the carrier to lower the carrier. When the carrier is again raised by reverse winch action, the carrier rises until its latching mechanisms reengage the cooperating mechanisms on the masthead. The latching mechanisms rather than the suspensory action suspend the carrier as otherwise the cables would be called upon to bear too heavy a load for too long a time between maintenance calls. It is important for safety as well as other reasons that the operator of the winch know when the carrier has engaged or been freed of its latching engagement with the top portion of the pole respectively on its way up or down the pole.

In the past, judgement of the position of the carrier relative to the top of the pole has often been a matter of the acuity of the visual perception of the winch operator. But such perceptions can, at the distances involved, sometimes be erroneous with the possible result that undue tension may be placed upon one or more of the cables thereby elongating them relative to the others. Sometimes the winch operator, thinking that the carrier has been placed in its latched-in position, mistakenly relaxes the winch cable whereupon the carrier falls to the ground.

In order to prevent this, some visual indicating systems are known in the art. For example, in the aforesaid U.S. patent, a system is shown and claimed in which the carrier is provided with a spring-loaded, shock-absorbing suspensory cable termination system. The system operates such that only when the plurality of the carrier latching mechanisms are engaging their cooperating latching mechanisms in the masthead do brightly-colored terminations on the suspensory cables become visible from below. This system, while effective for its intended purpose, may sometimes be more expensive than is economically feasible for a given installation.

Another system known to the art is described in U.S. Pat. No. 3,911,267 issued Oct. 7, 1975 in which the carrier bears a colored movable disc or signal mounted on an arm for movement about a horizontal pivot. It normally is biased so that when the carrier is lowered or not at its maximum upward position, the disc is angled upward so that the disc is barely visible or appears, at best, elliptical in shape. When the carrier is at its maximum upward position, the signalling arm is urged by contact with the masthead into a substantially horizontal position whereupon the disc appears as essentially round to the ground observer. It is conceivable that ground observers with ocular defects possibly could misconstrue a full circle as being an ellipse or vice-versa.

It is believed that the present system, being quite simple and relatively inexpensive as well as substantially maintenance-free offers considerable advantages over prior art systems in certain applications.

SUMMARY OF THE INVENTION

A signalling sub-assembly includes a first portion joined to a second portion extending in orthogonally related directions. The sub-assembly is mounted on either the masthead or carrier in such a way that when the carrier makes contact with the masthead, the first portion is shifted axially whereupon the second portion is moved pivotally in a horizontal plane to produce a signal visible from below.

BRIEF DESCRIPTION OF THE DRAWINGS

FIG. 1 is an isometric view, partly schematic, of a tall pole carrier lowering assembly showing one embodiment of the invention;

FIG. 2 is an enlarged, isometric view of part of the assembly shown in FIG. 1;

FIG. 3 is a fragmentary view from below the carrier shown in FIG. 1 taken in the region and in the direction indicated by the view lines 3—3 of FIG. 1;

FIG. 4 is a fragmentary side elevation view, partly in cross-section, of an enlarged part of the system shown in FIG. 1 depicting a carrier about to make contact with the top portion of the pole;

DETAILED DESCRIPTION OF THE DRAWINGS

Figure 5:
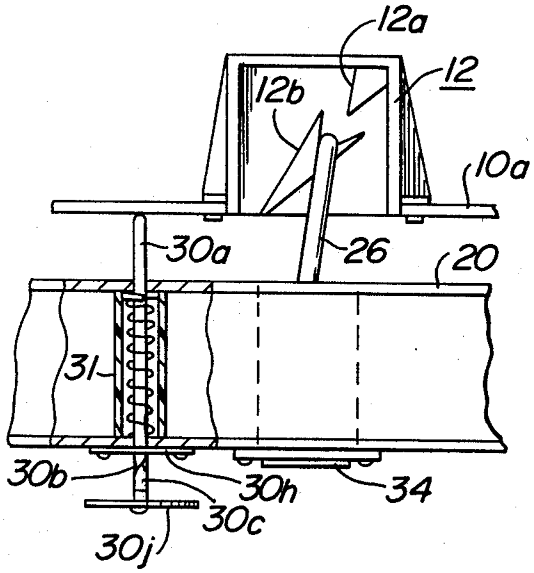
FIG. 5 is a view generally similar to FIG. 4 except that it shows the positional changes in the apparatus after the carrier makes contact with the top portion.

Referring first to FIGS. 1-5, there is shown a pole indicated by the broken line 11 having a top portion or masthead 10 on which there are plurality of sets of pulleys 18 mounted to brackets 14. Suspensory cables 17 for the carrier 20 pass over them, the outer free ends of the cable 17 being attached to appropriate terminating mechanisms, indicated generally at 28, which are equally spaced on carrier 20. The cables 17 pass downwardly through an aperture 16 in the masthead 10 to a linkage mechanism (not shown) such as that shown in my copending application Ser. No. 943,726, filed Sept. 18, 1978, now U.S. Pat. No. 4,228,488 entitled "Luminaire Raising and Lowering System". The linkage mechanism is, itself, attached to a single winch cable that proceeds downward and around a winch drum which may be activated by the insertion of a power drill thorugh an aperture (not shown) in the side of the pole 11 toward its base.

The carrier 20 may be generally annular, as shown, having a number of tenons or arms 22 at the end of which luminaires 24 or the like are attached. The carrier 20 also includes a number of hook-like latching means 26 which are constructed to engage their counterpart latching means 12 located in the masthead 10 when the carrier has been raised to the proper position on the pole. The operation of this form of latching system is described in detail in my copending application referred to above. When this happens, the carrier is no longer supported by the cables 17, but rather by the latching mechanisms.

As stated earlier, it is important for the winch operator or the maintenance crew to know exactly when all parts of the annular carrier 20 are so close to the top of the pole that the latching system has operated. In accordance with the present invention, a number of sub-assemblies 30 (FIG. 2) are employed which enable the winch operator at the bottom of the pole to ascertain visually when the carrier has reached the desired height. Each visual indicating sub-assembly 30 is generally L-shaped and includes a generally vertical portion 30*a* topped by a rounded upper end 30*m*. It is substantially square in cross-section and extends upwardly through one of the apertures 20*a* formed in the upper surface 20*c* of the carrier 20 and downwardly through an aligned aperture in the lower surface 20*b*. There is also a horizontal leg portion 30*c* formed of the same material as the vertical portion which is disposed below the lower surface 20*b* of the carrier (FIGS. 4 and 5).

The vertical portion of the L-shaped sub-assembly is retained in place by a bracket 30*h* having key-hole slots 30*g* formed in the bracket 30*h* to accommodate fastening screws or the like. The bracket also includes a generally square aperture 30*k* slightly larger than the cross-section of the junction portion 30*b* of the L-shaped sub-assembly. As can be seen in FIG. 2, the junction 30*b* is characterized by a twist in its formation.

A ring 30*f* is fixed to the vertical portion 30*a* about one-third from the top which prevents an encircling spring 30*d* which is not under compression from escaping upwardly past it and which also limits the upward movement of the portion 30*a*. If desired, a sleeve 31 made of plastic, for example, fits around the spring 30*d* between 20*b* and 20*c*. At the end of the horizontal portion 30*c* there is a shield disc 30*j* whose cross-section is slightly larger than the highly colored area 34 applied to the plate 32 which is screwed to the lower surface 20*b* of the carrier.

It will be seen that, in the absence of any downward pressure upon the member 30*a* exerted by the lower surface 10*a* as the carrier is raised toward it, the spring 30*d* is not under compression so that the horizontal portion 30*c* maintains the obscuring disc 30*j* over the highly colored area 34 on the plate 32 (FIG. 4). However, when the carrier 20 is moved up so that the rounded end 30*m* makes contact with the lower surface 10*a*, the latch arm 26 will meet and begin to ride up on the lower surface of the bifurcated member 12*b* of the latching assembly 12 in the manner shown in my copending application referred to above. The pressure exerted downwardly upon the vertical member 30*a* by surface 10*a* will cause 30*a* to move axially downward and the twist 30*b* passing through aperture 30*k* in the bracket 30*h* will cause the L-shaped member to pivot approximately 90° in a clockwise direction as viewed from above (FIG. 5). This will, in turn, shift the obscuring disc 30*j* from its position just below the highly colored area 34 thereby exposing it.

If the carrier 20 is not strictly horizontal as it approaches the masthead 10 because of differences in the tension applied to the various cables 17 or because of differences in their length (due to unequal stretching, for example) this condition will be immediately apparent to the operator below. He can, by observing the undersurface of the carrier 20 see to what extent each of the three obscuring discs 30*j* have been pivoted out of their rest position covering the areas 34. He can, therefore, be alerted as to possible troubles in the suspensory cable line. By being prewarned, he can avoid over-tensioning of the cables by continued operation of the winch. The converse observations will help to avoid problems when the carrier is being lowered.

Figure 6:
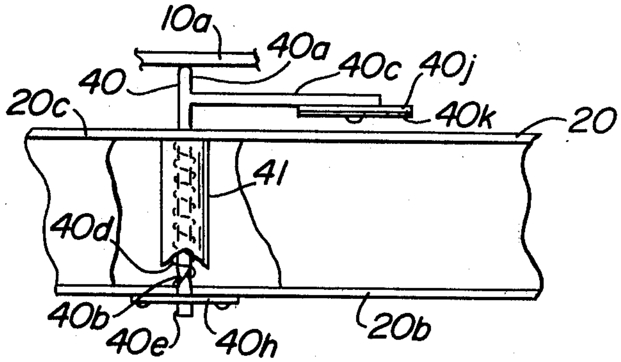
FIG. 6 is a fragmentary side elevation view of another form of the present invention.
Figure 7:
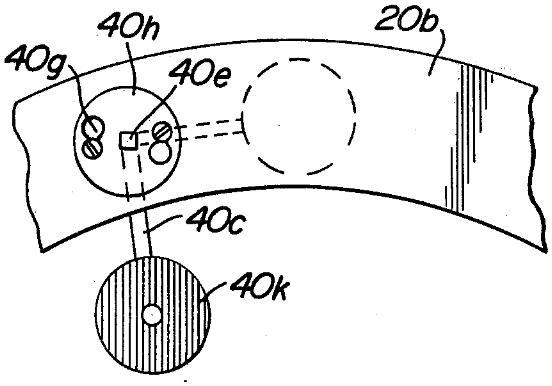
FIG. 7 is a fragmentary view from below the carrier of the apparatus shown in FIG. 6 when the carrier has attained a predetermined vertical position at the top of the pole.

FIGS. 6 and 7 show another form of the invention in which there is no use of highly colored areas formed on the undersurface of the carrier 20. There is, instead, a generally inverted L-shaped member 40 comprising a vertical portion 40*a*, a horizontal portion 40*c* to which a disc 40*j* is attached whose lower surface 40*k* is highly colored. The horizontal portion 40*c*, instead of being located below the carrier 20, is positioned between the upper surface 20*c* of the carrier and the lower surface 10*a* of the masthead. Toward the lower end 40*e* of the vertical portion there is a twisted portion 40*b* which will engage a slightly larger squarish aperture formed in the plate 40*h*. Accordingly, when the portion 40*a* is pushed downwardly against the bias of the spring 40*d*, the engagement of the twist 40*b* with the aperture in bracket 40*h* will cause the member 40 to pivot to a maximum position shown in full lines in FIG. 7. Therefore, the highly colored area 40*k* will be visible from the ground indicating that the associated part of the carrier 20 has come into latching engagement with the masthead 10.

I claim:

1. In a system for raising and lowering a carrier for luminaires and the like to and from the top portion of a pole, an assembly for providing a visual indication of the carrier reaching a predetermined position adjacent the top of said pole, said assembly including:

(a) a generally L-shaped member mounted on the carrier for limited axial and pivotal movement, said member having a vertical portion with an upper end and a horizontal portion with an enlarged position-indicating member mounted on an extended end thereof, said indicating member being movable between first and second positions, said first position providing a visual indication that the carrier reached said predetermined position adjacent the top of the pole;

(b) bracket means for mounting the L-shaped member on the carrier, said bracket means having an aperture through which the vertical portion of said L-shaped member projects;

(c) means for biasing the position-indicating member toward the second position; and (d) the vertical portion of the L-shaped member having a twisted area engageable with the bracket means within the aperture whereby said vertical portion will rotate as it moves axially through the aperture of the bracket means upon the top end of said vertical portion contacting the top portion of the pole to pivot the horizontal portion and the position-indicating member to the first position to provide a visual indication that the carrier has reached the predetermined position.

2. The assembly defined in claim 1 in which the biasing means is a coil spring telescopically mounted on the vertical portion of the L-shaped member; and in which the spring is compressed as the vertical member is moved axially upon the upper end thereof contacting a top portion of a pole.

3. The assembly defined in claim 1 in which the aperature of the bracket means is generally squared and is complementary to and slightly larger than the cross-sectional configuration of the vertical portion of the L-shaped member.

4. The assembly defined in claim 1 in which the position-indicating member has a brightly colored bottom surface which is readily visible from below the top of the pole and carrier to indicate to an observer that the carrier has reached the predetermined position.

5. The assembly defined in claim 1 in which a brightly colored area is provided on an under surface of the carrier; in which the position-indicating member covers the colored area when it is in the second position, in which position it remains when the carrier has not attained the predetermined position; and in which said indicating member is moved to the first position and uncovers said colored area when the top of the vertical portion of the L-shaped member contacts the top portion of the pole.

* * * * *